United States Patent
Petersson et al.

(10) Patent No.: US 10,666,333 B2
(45) Date of Patent: May 26, 2020

(54) SIGNAL TRANSMISSION DIVERSITY

(71) Applicant: Telefonaktiebolaget LM Ericsson (publ), Stockholm (SE)

(72) Inventors: Sven Petersson, Sävedalen (SE); Fredrik Athley, Kullavik (SE); Andreas Nilsson, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/769,168

(22) PCT Filed: Mar. 22, 2018

(86) PCT No.: PCT/EP2018/057319
§ 371 (c)(1),
(2) Date: Dec. 10, 2018

(87) PCT Pub. No.: WO2019/179626
PCT Pub. Date: Sep. 26, 2019

(65) Prior Publication Data
US 2019/0393943 A1    Dec. 26, 2019

(51) Int. Cl.
*H04B 7/06*    (2006.01)
*H04B 7/10*    (2017.01)

(52) U.S. Cl.
CPC ............. *H04B 7/0613* (2013.01); *H04B 7/10* (2013.01)

(58) Field of Classification Search
CPC ................................ H04B 7/0613; H04B 7/10
See application file for complete search history.

(56) References Cited

U.S. PATENT DOCUMENTS

| | | |
|---|---|---|
| 6,721,300 B1 | 4/2004 | Toru et al. |
| 2011/0216845 A1* | 9/2011 | Nakao .................. H04B 7/0413 375/295 |
| 2012/0113816 A1* | 5/2012 | Bhattad ................. H04L 5/0032 370/246 |
| 2014/0211731 A1 | 7/2014 | Yuki et al. |

FOREIGN PATENT DOCUMENTS

| WO | WO 2017/082952 A1 | 5/2017 |
|---|---|---|
| WO | WO 2017/087022 A1 | 5/2017 |

OTHER PUBLICATIONS

Transmittal of International Search Report and Written Opinion of the International Searching Authority, International Search Report, and Written Opinion of the International Searching Authority, PCT/EP2018/057319, dated Dec. 10, 2018, 18 pages.

* cited by examiner

*Primary Examiner* — Nguyen T Vo
(74) *Attorney, Agent, or Firm* — Sage Patent Group

(57) ABSTRACT

There is provided mechanisms for signal transmission diversity at an antenna array of a radio transceiver device. The antenna array has two physical antenna ports. A method is performed by the radio transceiver device. The method comprises creating two virtual antenna ports for each of the two physical antenna ports, resulting in four virtual antenna ports. The method comprises transmitting the signal from the four virtual antenna ports towards another radio transceiver device over four different radio propagation channels, one radio propagation channel per virtual antenna port.

21 Claims, 8 Drawing Sheets

(a)

Symbols k, k +1

(b)

Symbols k+2, k+3

SIGNAL TRANSMISSION DIVERSITY

CROSS REFERENCE TO RELATED APPLICATIONS

This application is a 35 U.S.C. § 371 national stage application of PCT International Application No. PCT/EP2018/057319 filed on Mar. 22, 2018, the disclosure and content of which is incorporated by reference herein in its entirety.

TECHNICAL FIELD

Embodiments presented herein relate to a method, a radio transceiver device, a computer program, and a computer program product for signal transmission diversity at an antenna array of the radio transceiver device.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for terminal devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node at the network side and at the terminal devices at the user side might be required to reach a sufficient link budget.

In general terms, the use of beamforming could imply that the terminal devices will be not only operatively connected to the network node via a beam but also performs a handover between (narrow) beams instead of between network nodes of different cells. At higher frequency bands high-gain beamforming with narrow beams could be used due to more challenging radio propagation properties than at lower frequency bands. Each beam will only be optimal within a small area and the link budget outside the optimal beam will deteriorate quickly. Hence, frequent and fast beam switching is needed to maintain high performance. This is hereinafter referred to as beam management. One purpose of so-called beam management is thus for the network node to keep track of its served terminal devices with narrow beams (as used at the transmission and reception point (TRP) of the network node and/or the terminal devices) in order to increase coverage and throughput.

At higher frequency bands where diffraction and penetration losses might be comparatively high, there is a larger risk that served terminal devices will be blocked and lose connection to the TRP of the serving network node. Transmission diversity schemes might be used to mitigate this issue. Transmission diversity schemes are included in the Long Term Evolution (LTE) suite of telecommunications standards. On example of such transmission diversity scheme is space-time block coding based transmit diversity (or Space-Time Transmit Diversity; STTD for short). STTD utilizes space-time block codes (STBC) in order to exploit redundancy in multiple transmitted versions of a signal. STTD can be applied to single symbols in QAM code words or CDMA code words, or subcarrier symbols in OFDM based schemes.

However, using STTD with, say, four antenna ports, together with an analog antenna array, or panel, having two antenna ports in order to attain transmission diversity would require the TRP to be equipped with two analog antenna arrays (where two of the four antenna ports for the STTD transmission are connected to the two antenna ports per antenna array). Having two antenna arrays requires twice the cost as for one antenna array and requires twice the space as for one antenna array. Since antenna arrays could be expensive and space is a scarce resource in the TRP this option thus comes with some drawbacks.

Hence, there is still a need for improved mechanisms for transmission diversity.

SUMMARY

An object of embodiments herein is to provide mechanisms for efficient transmission diversity that do not suffer from the issues noted above, or at least where these issues are reduced or mitigated.

According to a first aspect there is presented a method for signal transmission diversity at an antenna array of a radio transceiver device. The antenna array has two physical antenna ports. The method is performed by the radio transceiver device. The method comprises creating two virtual antenna ports for each of the two physical antenna ports, resulting in four virtual antenna ports. The method comprises transmitting the signal from the four virtual antenna ports towards another radio transceiver device over four different radio propagation channels, one radio propagation channel per virtual antenna port.

According to a second aspect there is presented a radio transceiver device for signal transmission diversity at an antenna array of the radio transceiver device. The antenna array has two physical antenna ports. The radio transceiver device comprises processing circuitry. The processing circuitry is configured to cause the radio transceiver device to create two virtual antenna ports for each of the two physical antenna ports, resulting in four virtual antenna ports. The processing circuitry is configured to cause the radio transceiver device to transmit the signal from the four virtual antenna ports towards another radio transceiver device over four different radio propagation channels, one radio propagation channel per virtual antenna port.

According to a third aspect there is presented a radio transceiver device for signal transmission diversity at an antenna array of the radio transceiver device. The antenna array has two physical antenna ports. The radio transceiver device comprises a create module configured to create two virtual antenna ports for each of the two physical antenna ports, resulting in four virtual antenna ports. The radio transceiver device comprises a transmit module configured to transmit the signal from the four virtual antenna ports towards another radio transceiver device over four different radio propagation channels, one radio propagation channel per virtual antenna port.

According to a fourth aspect there is presented a computer program for signal transmission diversity at an antenna array of a radio transceiver device, the computer program comprising computer program code which, when run on a radio transceiver device according to the second aspect, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this method and this radio transceiver device enable efficient transmission diversity.

Advantageously, this method and this radio transceiver device enable a four-port STTD transmission scheme to be applied on a single two-port antenna array and increases the transmission diversity compared to using only a two-port STTD transmission scheme.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
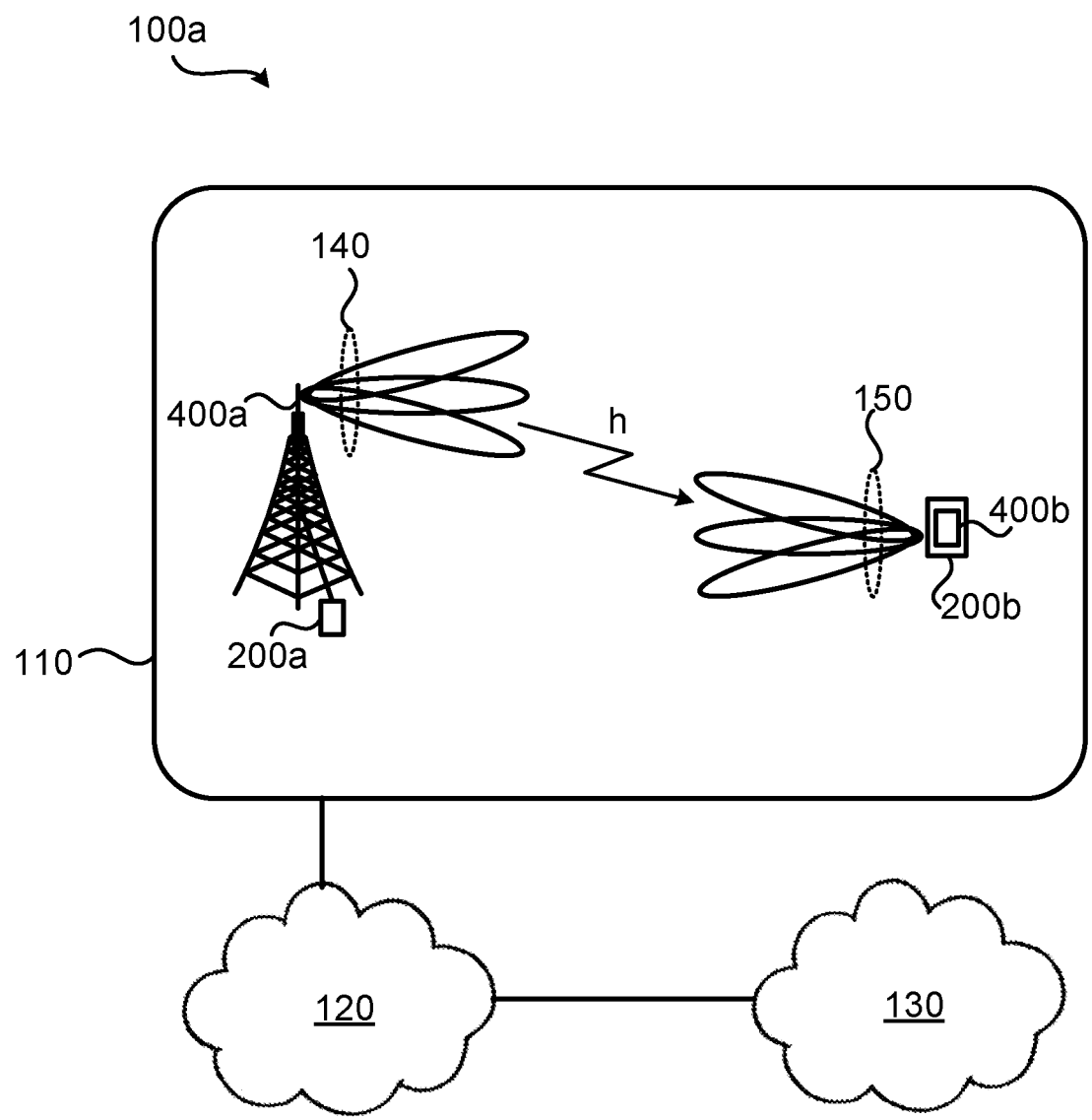
FIGS. 1, 2, 3, 5, 7, and 8 are schematic diagrams illustrating communications networks according to embodiments.

FIG. 1 is a schematic diagram illustrating a communications network 100a where embodiments presented herein can be applied. The communications network 100a could be a third generation (3G) telecommunications network, a fourth generation (4G) telecommunications network, or a fifth (5G) telecommunications network and support any 3GPP telecommunications standard, where applicable.

The communications network 100a comprises a radio transceiver device 200a configured to, via TRP 400a, provide network access over one or more radio propagation channels h to a radio transceiver device 200b, comprising TRP 400b, in a radio access network 110. Each TRP 400a, 400b might comprise at least one antenna array. The antenna array of TRP 400a might thus represent, or define the antenna array of radio transceiver device 200a, and likewise the antenna array of TRP 400b might thus represent, or define the antenna array of radio transceiver device 200b. In some embodiments radio transceiver device 200b is part of, integrated with, or collocated with, a terminal device and radio transceiver device 200a is part of, integrated with, or collocated with, a network node.

Radio access network 110 is operatively connected to a core network 120. The core network 120 is in turn operatively connected to a service network 13o, such as the Internet. Radio transceiver device 200b is thereby, via the TRP 400a and radio transceiver device 200a, enabled to access services of, and exchange data with, the service network 130.

Examples of network nodes are radio access network nodes, radio base stations, base transceiver stations, Node Bs, evolved Node Bs, g Node Bs, access points, access nodes, and backhaul nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

Radio transceiver device 200b is, via TRP 400b, configured to communicate with radio transceiver device 200a in at least one beam 150. Further, radio transceiver device 200a is, via TRP 400a, configured to communicate with radio transceiver device 200b in beams 140. Radio transceiver devices 200a, 200b could be configured to communicate using a variety of beams having different shapes and widths, herein generally referred to as having different beam patterns.

The herein disclosed embodiments can be applied at a radio transceiver device 200a, 200b implemented both a radio access network nodes and terminal devices, or even as radio transceiver devices implemented as backhauling nodes or a sidelink nodes. Thus, although radio transceiver device 200a in at least some of the herein disclosed embodiments is described as being a network node and radio transceiver device 200b is described as being a terminal device, the functionality of the herein disclosed radio transceiver device 200a could equally be implemented in a terminal device, and vice versa for radio transceiver device 200b.

Figure 2:
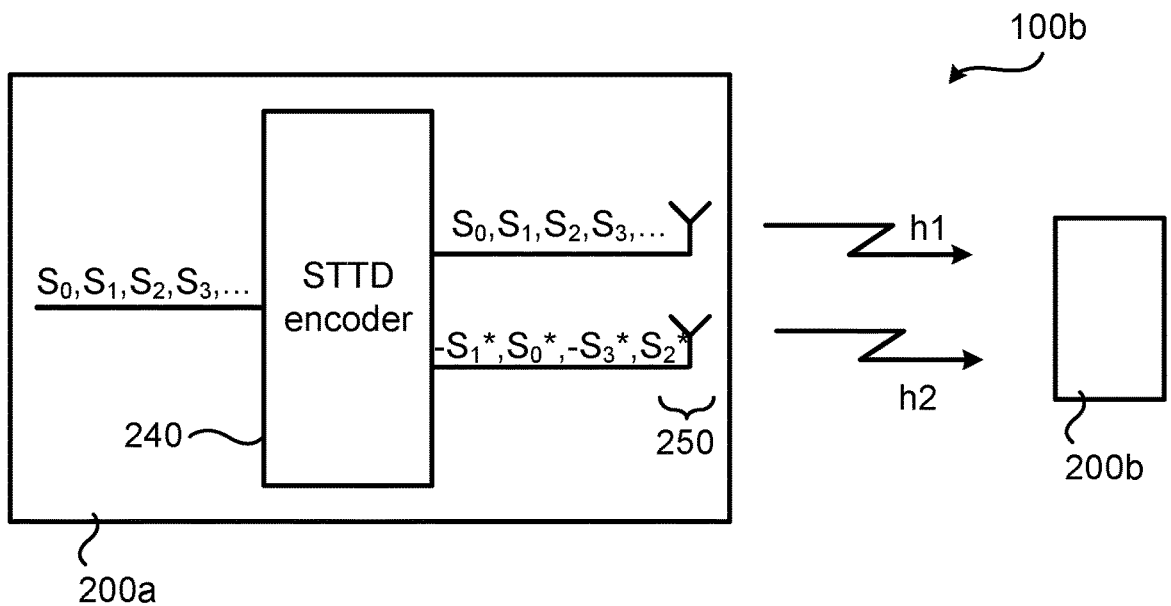

As disclosed above, one way to increase transmission diversity is to use STTD. To illustrate this, one example of a two antenna port STTD scheme is illustrated in the communications network 100b of FIG. 2 and a four antenna port STTD scheme is illustrated in the communications network 100c of FIG. 3, where radio transceiver device 200a comprises an STTD encoder 240 for mapping a sequence of symbols S0, S1, S2, S3, . . . of a signal to antenna ports of an antenna array 250. In FIG. 2 the symbols are mapped to two antenna ports whereas in FIG. 3 the symbols are mapped to four antenna ports. According to FIG. 2, the symbols S0, S1, S2, S3, . . . are thus transmitted from a first antenna port over a first radio propagation channel h1 towards radio transceiver device 200b and the symbols −S1*, S0*, −S3*, S2*, . . . are transmitted from a second antenna port over a second radio propagation channel h2 towards radio transceiver device 200b. According to FIG. 3, the symbols S0, S1, 0, 0, . . . are thus transmitted from a first antenna port over a first radio propagation channel h1 towards radio transceiver device 200b, the symbols 0, 0, S2, S3, . . . are transmitted from a second antenna port over a second radio propagation channel h2 towards radio transceiver device 200b, the symbols −S1*, S0*, 0, 0, . . . are transmitted from a third antenna port over a third radio propagation channel h3 towards radio transceiver device 200b, and the symbols 0, 0, −S3*, S2*, . . . are transmitted from a fourth antenna port over a fourth radio propagation channel h4 towards radio transceiver device 200b.

Figure 3:
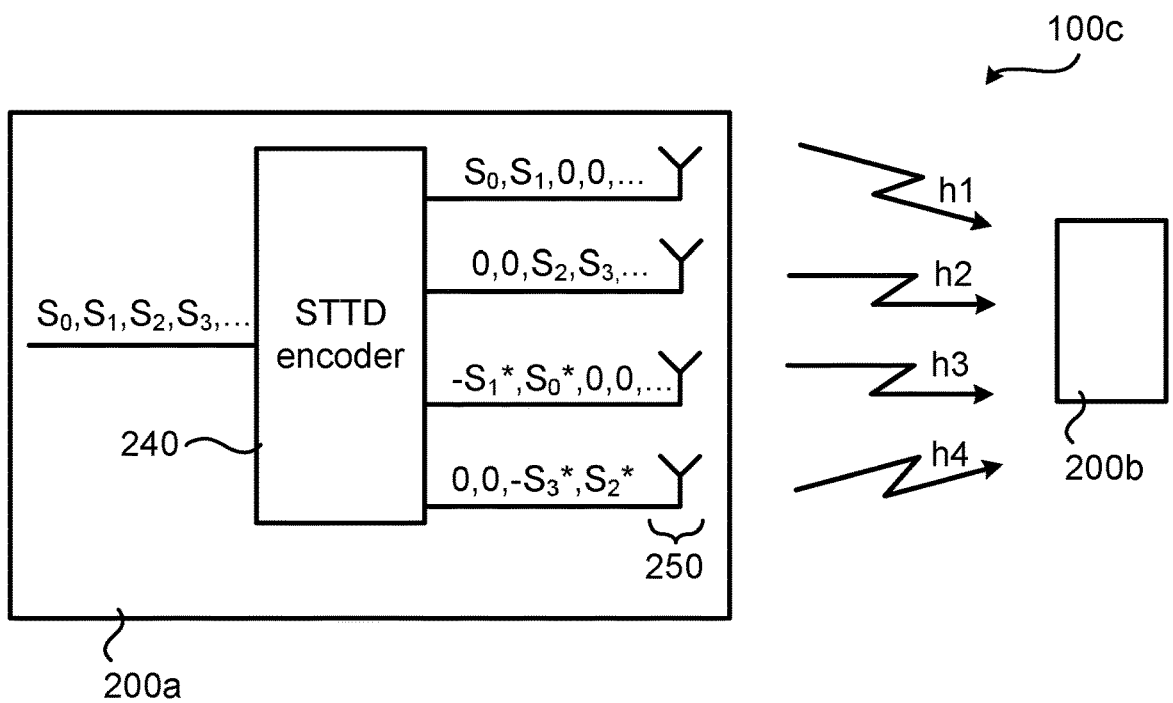

The STTD schemes of FIGS. 2 and 3 can be applied also to analog antenna arrays (i.e., without the use of a dedicated STTD encoder 240). For example, the two antenna port STD scheme can be applied on the two antenna ports corresponding to the two polarizations of a transmission beam 140 generated at the analog antenna array. And in similar way, if the antenna array is dual-polarized and thus comprises antenna elements of two polarizations, the four antenna port STTD scheme can be applied by mapping two antenna ports corresponding to the two polarizations per transmission beam 140 per antenna array. However, as also disclosed above this would require two antenna arrays, which might be prohibited for reasons of cost and space.

The embodiments disclosed herein therefore relate to mechanisms for signal transmission diversity at an antenna array of a radio transceiver device 200a that do not suffer from the issues noted above, or at least where these issues are reduced or mitigated. In order to obtain such mechanisms there is provided a radio transceiver device 200a, a method performed by the radio transceiver device 200a, a computer program product comprising code, for example in the form of a computer program, that when run on a radio transceiver device 200a, causes the radio transceiver device 200a to perform the method.

Figure 4:
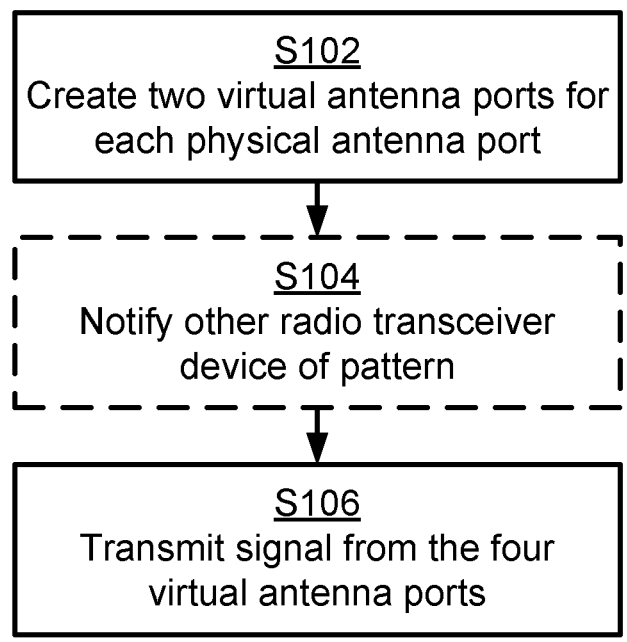
FIGS. 4 and 6 are flowcharts of methods according to embodiments.

FIG. 4 is a flowchart illustrating embodiments of methods for signal transmission diversity at an antenna array of radio transceiver device 200a. The antenna array has two physical antenna ports. The methods are performed by radio transceiver device 200a. The methods are advantageously provided as computer programs 1120.

In order to achieve signal transmission diversity, each physical antenna port is used to create two virtual antenna ports. Hence, radio transceiver device 200a is configured to perform step S102:

S102: Radio transceiver device 200a creates two virtual antenna ports for each of the two physical antenna ports, resulting in four virtual antenna ports.

The signal is then transmitted on the created virtual antenna ports. Thus, radio transceiver device 200a is configured to perform step S106:

S106: Radio transceiver device 200a transmits the signal from the four virtual antenna ports towards radio transceiver device 200b over four different radio propagation channels h1, h2, h3, h4; one radio propagation channel per virtual antenna port.

In this way a four-port STTD transmission scheme can be applied on a two-port antenna array (i.e., an antenna array having only two physical antenna ports).

Embodiments relating to further details of signal transmission diversity at an antenna array of radio transceiver device 200a as performed by radio transceiver device 200a will now be disclosed.

There could be different types of antenna arrays. According to an embodiment the antenna array is an analog antenna array. The four-port STTD transmission scheme can thereby be applied on a two-port analog antenna array (or two single-port analog antenna arrays).

There might be different ways to create the virtual antenna ports. In some aspects two pairs of virtual antenna ports are created. Particularly, according to an embodiment the virtual antenna ports are paired two and two, such that two pairs of virtual antenna ports are created.

There might be different ways in which the virtual antenna ports are paired. In some aspects each pair of virtual antenna ports consists of one virtual antenna port created from each of the two physical antenna ports. Hence, according to an embodiment each of the two pairs of virtual antenna ports has virtual antenna ports created from each of the two physical antenna ports. However, according to another embodiment a first of the two pairs of virtual antenna ports is created from virtual antenna ports of only the first of the physical antenna ports, and a second of the two pairs of virtual antenna ports is created from virtual antenna ports of only a second of the physical antenna ports.

There might be different ways to transmit the signal from the virtual antenna ports. In some aspects only one of the pairs of virtual ports is used in each time instant for transmitting the signal. Particularly, according to an embodiment, at each time instant, the signal is only transmitted from the two virtual antenna ports at one of the two pairs of virtual antenna ports. In some aspects each time instant corresponds to one OFDM symbol. As will be further disclosed below, the transmission of the signal might follow a pattern.

There may be different ways to define the four radio propagation channels h1, h2, h3, h4. In some aspects the radio propagation channels propagate along paths towards radio transceiver device 200b. In more detail, there could be two such paths that the radio propagation channels propagate along.

Particularly, according to an embodiment the first radio propagation channel h1 and the second radio propagation channel h2 propagate along a first path 170a towards radio transceiver device 200b, and the third radio propagation channel h3 and the fourth radio propagation channel h4 propagate along a second path 170b towards radio transceiver device 200b.

There might be different ways to map the four virtual antenna ports with the four radio propagation channels h1, h2, h3, h4.

In some aspects the first radio propagation channel h1 and the third radio propagation channel h3 are mapped to one of the two pairs of virtual antenna ports and the second radio propagation channel h2 and the fourth radio propagation channel h4 are mapped to the other of the two pairs of virtual antenna ports. This is the case in the communications network 100d of FIG. 5. Hence, according to a first embodiment the signal from a first of the two pairs of virtual antenna ports is transmitted over the first radio propagation channel h1 and the third radio propagation channel h3, and the signal from a second of the two pairs of virtual antenna ports is transmitted over the second radio propagation channel h2 and the fourth radio propagation channel h4.

In some aspects the first radio propagation channel h1 and the fourth radio propagation channel h4 are mapped to one of the two pairs of virtual antenna ports and the second radio propagation channel h2 and the third radio propagation channel h3 are mapped to the other of the two pairs of virtual antenna ports. This is the case in FIG. 7. Hence, according to a second embodiment the signal from a first of the two pairs of virtual antenna ports is transmitted over the first radio propagation channel h1 and the fourth radio propagation channel h4, and the signal from a second of the two pairs of virtual antenna ports is transmitted over the second radio propagation channel h2 and the third radio propagation channel h3.

In some aspects the first radio propagation channel h1 and the second radio propagation channel h2 are mapped to one of the two pairs of virtual antenna ports and the third radio propagation channel h3 and the fourth radio propagation channel h4 are mapped to the other of the two pairs of virtual antenna ports. This is the case in FIG. 8. Hence, according to a third embodiment the signal from a first of the two pairs of virtual antenna ports is transmitted over the first radio propagation channel h1 and the second radio propagation channel h2, and the signal from a second of the two pairs of virtual antenna ports is transmitted over the third radio propagation channel h3 and the fourth radio propagation channel h4.

In some aspects the signal is transmitted using beamforming at the antenna array. Each virtual antenna ports might then have its own transmission beam. Particularly, according to an embodiment the signal from each of the four virtual antenna ports is transmitted in its own transmission beam. Further, in some aspects there are two transmission beams 140 each in two directions; one transmission beam 140 along each of the two paths. Particularly, according to an embodiment two of the transmission beams 140 in which the signal is transmitted from point along the first path 170*a* and the remaining two of the transmission beams 140 in which the signal is transmitted from point along the second path 170*b*. A four-port STTD encoder transmission could thereby be combined with beam management such that half of the symbols of the signal are transmitted in one of the beam directions and the other half of the symbols are transmitted in the second beam direction.

In some aspects the signal is transmitted using transmission beams 140 of different polarization for each of the two pairs of virtual antenna ports. Particularly, according to an embodiment, a respective first of the transmission beams 140 in which the signal is transmitted from each of the two pairs of virtual antenna ports has a first polarization and a respective second of the transmission beams 140 in which the signal is transmitted from each of the two pairs of virtual antenna ports has a second polarization. This could further increase the transmission diversity at the antenna array.

Further, a first of the transmission beams 140 in which the signal is transmitted from each of the two pairs of virtual antenna ports might then point along the first path 170*a*, and a second of the transmission beams 140 in which the signal is transmitted from each of the two pairs of virtual antenna ports might then point along the second path 170*b*. This could further increase the transmission diversity at the antenna array.

In some aspects the signal is transmitted using transmission beams 140 generated at two different sub-arrays, or panels, at the antenna array. Particularly, according to an embodiment the antenna array has two sub-arrays, where each sub-array defines its own panel. The virtual antenna port for the first radio propagation channel h1 and the virtual antenna port for the third radio propagation channel h3 are at a first of the two sub-arrays, and the virtual antenna port for the second radio propagation channel h2 and the virtual antenna port for the fourth radio propagation channel h4 are at a second of the two sub-arrays. This could further increase the transmission diversity at the antenna array.

As disclosed above, the transmission of the signal might follow a pattern. Further aspects relating thereto will now be disclosed. In particular, according to an embodiment, the signal comprises a sequence of symbols S0, S1, S2, S3, . . . , and the transmission of the signal follows a pattern.

There could be different examples of patterns. In some aspects the pattern specifies that half of the symbols are transmitted in two of the radio propagation channels, and the remaining half of the symbols are transmitted in the remaining two radio propagation channels. That is, according to an embodiment, according to the pattern, half the symbols are transmitted over two of the four radio propagation channels, and the remaining half of the symbols are transmitted over the two other radio propagation channels.

Three specific patterns will now be disclosed.

According to a first embodiment the pattern of transmitting the symbols S0, S1, S2, S3, . . . is defined such that the sequence of symbols S0, S1, 0, 0, . . . is transmitted over the first radio propagation channel h1, the sequence of symbols 0, 0, S2, S3, . . . is transmitted over the second radio propagation channel h2, the sequence of symbols −S1*, S0*, 0, 0, . . . is transmitted over the third radio propagation channel h3, and the sequence of symbols 0, 0, −S3*, S2*, . . . is transmitted over the fourth radio propagation channel h4, where −Sx denotes negation of signal Sx, and Sx* denotes conjugation of signal Sx. In some aspects the transmission of symbols over the second radio propagation channel h2 and the first radio propagation channel h1 are exchanged with each other and the transmission of symbols over the fourth radio propagation channel h4 and the third radio propagation channel h3 are exchanged with each other.

According to a second embodiment the pattern of transmitting the symbols S0, S1, S2, S3, . . . is defined such that the sequence of symbols S0, S1, 0, 0, . . . is transmitted over the first radio propagation channel h1, the sequence of symbols 0, 0, S2, S3, . . . is transmitted over the second radio propagation channel h2, the sequence of symbols 0, 0, −S3*, S2*, . . . is transmitted over the third radio propagation channel h3, and the sequence of symbols −S1*, S0*, 0, 0, . . . is transmitted over the fourth radio propagation channel h4 radio propagation channel, where −Sx denotes negation of signal Sx, and Sx* denotes conjugation of signal Sx. In some aspects the transmission of symbols over the second radio propagation channel h2 and the first radio propagation channel h1 are exchanged with each other and the transmission of symbols over the fourth radio propagation channel h4 and the third radio propagation channel h3 are exchanged with each other.

According to a third embodiment the pattern of transmitting the symbols S0, S1, S2, S3, . . . is defined such that the sequence of symbols S0, S1, 0, 0, . . . is transmitted over the first radio propagation channel h1, the sequence of symbols −S1*, S0*, 0, 0, . . . is transmitted over the second radio propagation channel h2, the sequence of symbols 0, 0, S2, S3, . . . is transmitted over the third radio propagation channel h3, and the sequence of symbols 0, 0, −S3*, S2*, . . . is transmitted over the fourth radio propagation channel h4, where −Sx denotes negation of signal Sx, and Sx* denotes conjugation of signal Sx. In some aspects the transmission of symbols over the second radio propagation channel h2 and the first radio propagation channel h1 are exchanged with each other and the transmission of symbols over the fourth radio propagation channel h4 and the third radio propagation channel h3 are exchanged with each other.

The skilled person would understand how to, if needed, extend the above disclosed patterns to longer sequences than four symbols.

In some aspects radio transceiver device 200*a* as well as radio transceiver device 200*b* are hardcoded with the patterns and are hardcoded with information as when a respective one of the patterns is to be used. In other aspects radio transceiver device 200a informs radio transceiver device 200b about which pattern is to be used for the transmission of the signal, or for a specific sequence of symbols of the signals. Particularly, according to an embodiment radio transceiver device 200a is configured to perform (optional) step S104: S104: Radio transceiver device 200a notifies radio transceiver device 200b of the pattern before transmitting the signal to radio transceiver device 200b.

In some aspects the order of steps S102 and S104 are interchanged such that step S104 is performed before step S102. But steps S102 (and step S104 when performed) needs to be performed before step 106.

Typically the notifying is performed by radio transceiver device 200a sending a message to radio transceiver device 200b on a control channel, where the message comprises information that enables radio transceiver device 200b to identify which pattern is to be used, and, optionally, for which signal transmission the pattern is to be used.

In more detail, for example, prior to a beam management process radio transceiver device 200a might notify radio transceiver device 200b about the pattern for the coming transmission so that radio transceiver device 200b knows which pair of virtual antenna ports will be active at radio transceiver device 200a each time instant. Based on this radio transceiver device 200b can form one or more reception beams 150 that match the simultaneous use of two virtual antenna ports at radio transceiver device 200a (instead of radio transceiver device 200a simultaneously using all four virtual antenna ports).

This means that radio transceiver device 200b might be configured to generate one or more reception beams 150 matching the transmission beams 140 140 of radio transceiver device 200a, resulting in an improved link budget as compared to all four virtual antenna ports at radio transceiver device 200a being used simultaneously. This will be further disclosed below with reference to FIGS. 7 and 8.

Figure 5:
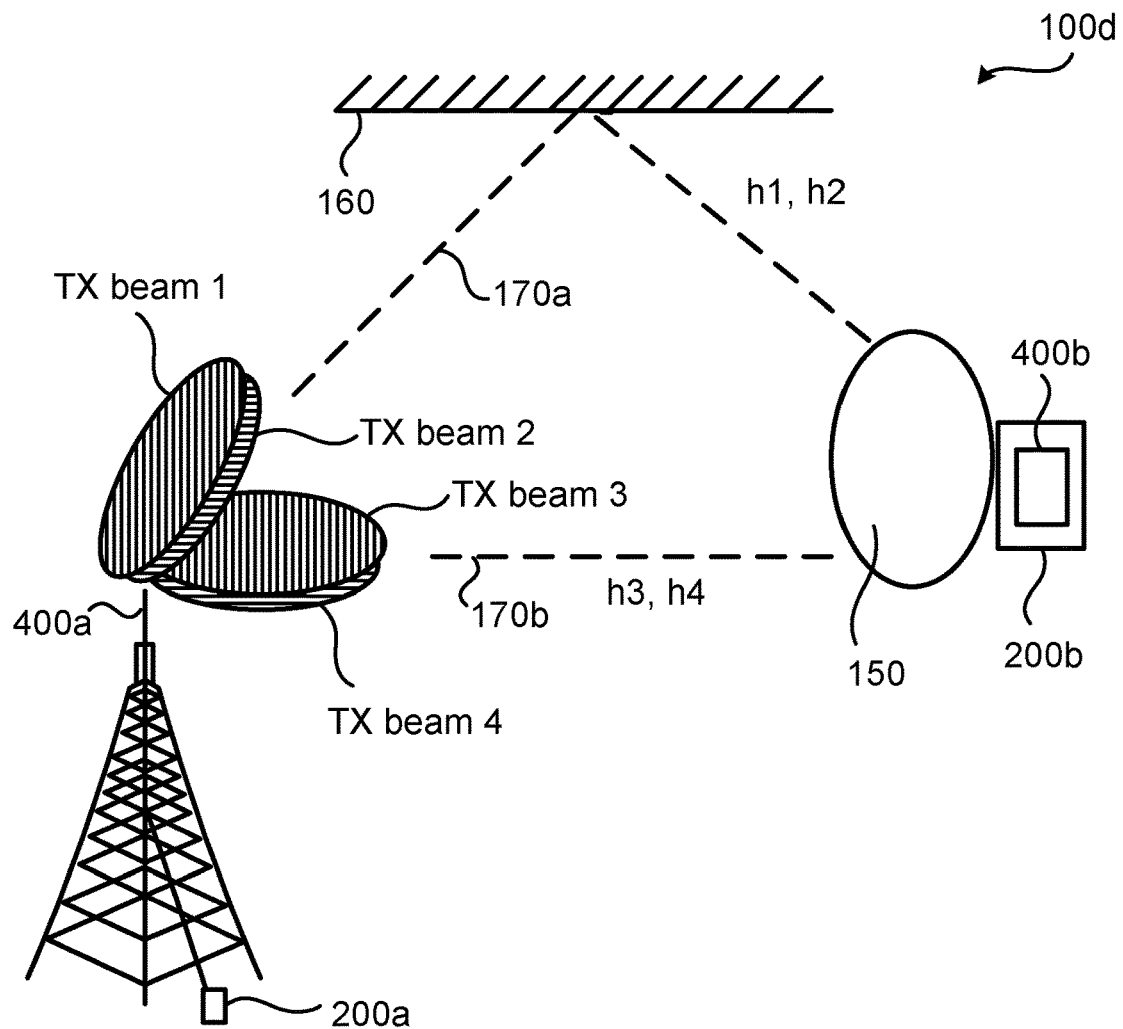

FIG. 5 gives an illustrative example of a scenario where at least some of the above disclosed embodiments are applied. In the illustrative communications network 100d of FIG. 5 which shows only a part of the communications network 100a, radio transceiver device 200a has determined two preferred transmit beam directions (e.g. based on transmit beam measurements and reporting from radio transceiver device 200b), where one direction correspond to transmission beams TX beam 1 (of a first polarization) and TX beam 2 (of a second polarization) and is along the first path 170a along which the first radio propagation channel h1 and the second radio propagation channel h2 propagate, and the second transmission beam direction corresponds to transmission beams TX beam 3 (of the first polarization) and TX beam 4 (of the second polarization) and is along the second path 170b along which the third radio propagation channel h3 and the fourth radio propagation channel h4 propagate. According to the illustrative example in FIG. 5, the second path 170b is a line of sight path towards radio transceiver device 200b whereas the first path 170a is reflected in a physical object 160 on its way towards radio transceiver device 200b.

Assume that radio transceiver device 200a uses a transmission diversity scheme whilst at the same time utilizes the two different paths created by the two preferred transmission beam directions in order to transmit a signal comprising a sequence of symbols S0, S1, S2, S3, . . . . In accordance with the above disclosed embodiments radio transceiver device 200a selects one of the above disclosed patterns, and starts by transmitting symbols S0 and S1 in TX beam 1 and symbols −S1* and S0* in TX beam 4 in the first two OFDM symbols. Then for the next two OFDM symbols, radio transceiver device 200a transmits symbols S2 and S3 in TX beam 2 and −S3* and S2* in TX beam 3. In this way four-port STTD diversity is attained using the two preferred transmission beam directions for radio transceiver device 200a. In the illustrative example of FIG. 5 radio transceiver device 200b uses a wide beam 150 during reception of the signal comprising the symbols and hence the beamforming performed by radio transceiver device 200a during the four-port STTD transmission can be done proprietary without the knowledge of radio transceiver device 200b, as long as the STTD scheme itself (as defined by the used pattern) is notified to radio transceiver device 200b in advance of the transmission of the signal.

Figure 6:
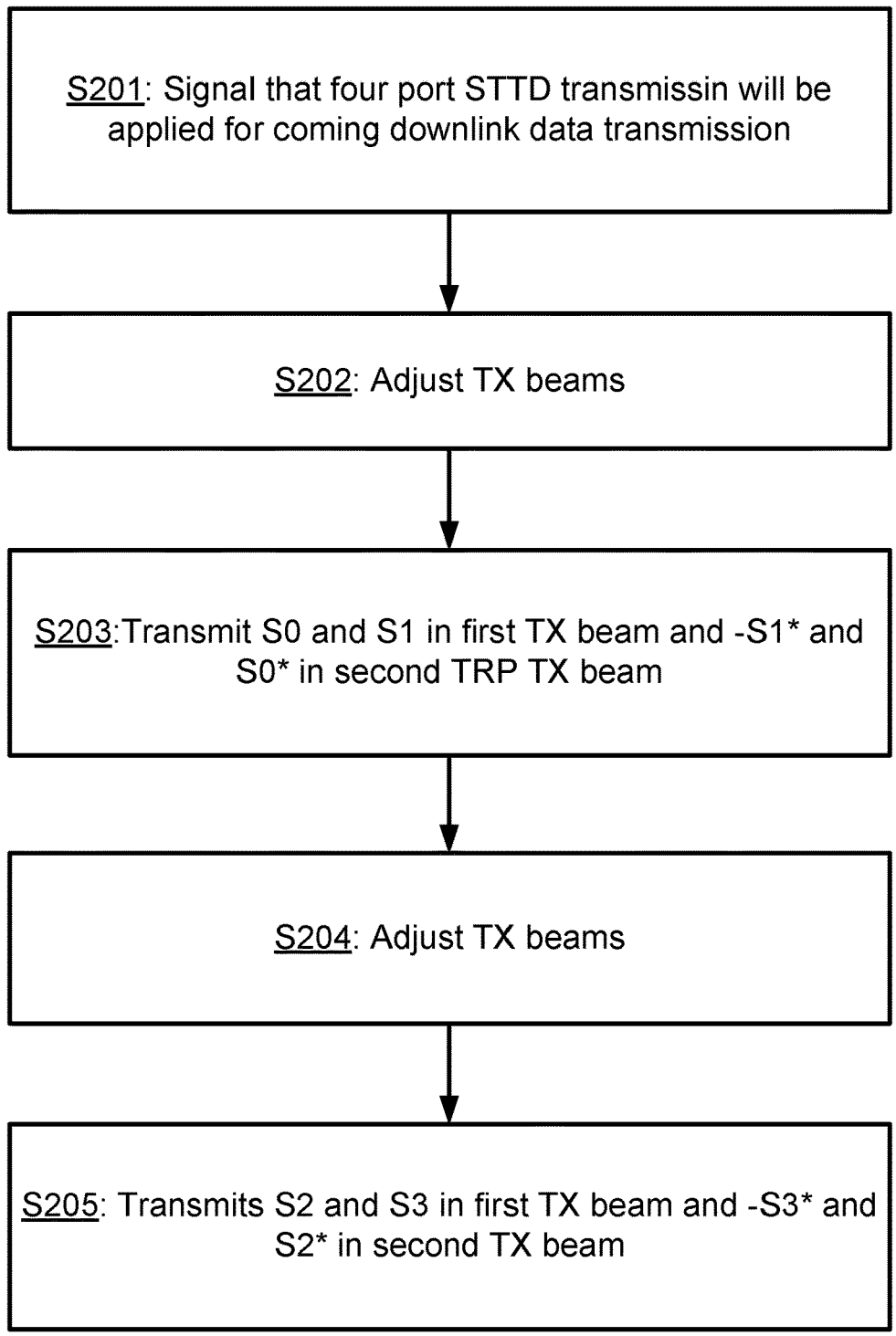

FIG. 6 is a flowchart of a method for signal transmission diversity at the antenna array of radio transceiver device 200a based on at least some of the embodiments disclosed above and matching the pattern of the first embodiment as well as the scenario in FIG. 5.

S201: Radio transceiver device 200a notifies radio transceiver device 200b that it will use four-port STTD downlink transmission for coming downlink data transmission by specifying the pattern to be used. Hence, radio transceiver device 200b is assumed to receive the notification.

S202: Radio transceiver device 200a adjusts its transmission beams 140 such that a first transmission beam 140 is configured with a first polarization of the antenna array and is pointing in a first transmission beam direction (along the first path 170a) and a second transmission beam 140 is configured with a second polarization of the antenna array and points in a second transmission beam direction (along the second path 170b), for example by applying TX beam 1 and TX beam 4 in the illustrative example of FIG. 5.

S203: Radio transceiver device 200a, for the two first OFDM symbols, transmits symbols S0 and S1 in the first transmission beam 140 and the symbols −S1* and S0* in the second transmission beam. Hence, radio transceiver device 200b is assumed to receive the symbols S0, S1, −S1* and S0*.

S204: Radio transceiver device 200a then adjusts its transmission beams 140 such that a first transmission beam 140 is configured with a second polarization of the antenna array and is pointing in a first transmission beam direction (along the first path 170a) and a second transmission beam 140 is configured with a first polarization of the antenna array and points in a second transmission beam direction (along the second path 170b), for example by applying TX beam 2 and TX beam 3 in the illustrative example of FIG. 5.

S205: Radio transceiver device 200a, for the next two OFDM symbols, transmits symbol S2 and S3 in the first transmission beam 140 and the symbols −S3* and S2* in the second transmission beam. Hence, radio transceiver device 200b is assumed to receive the symbols S2, S3, −S3*, and S2*.

Figure 7:
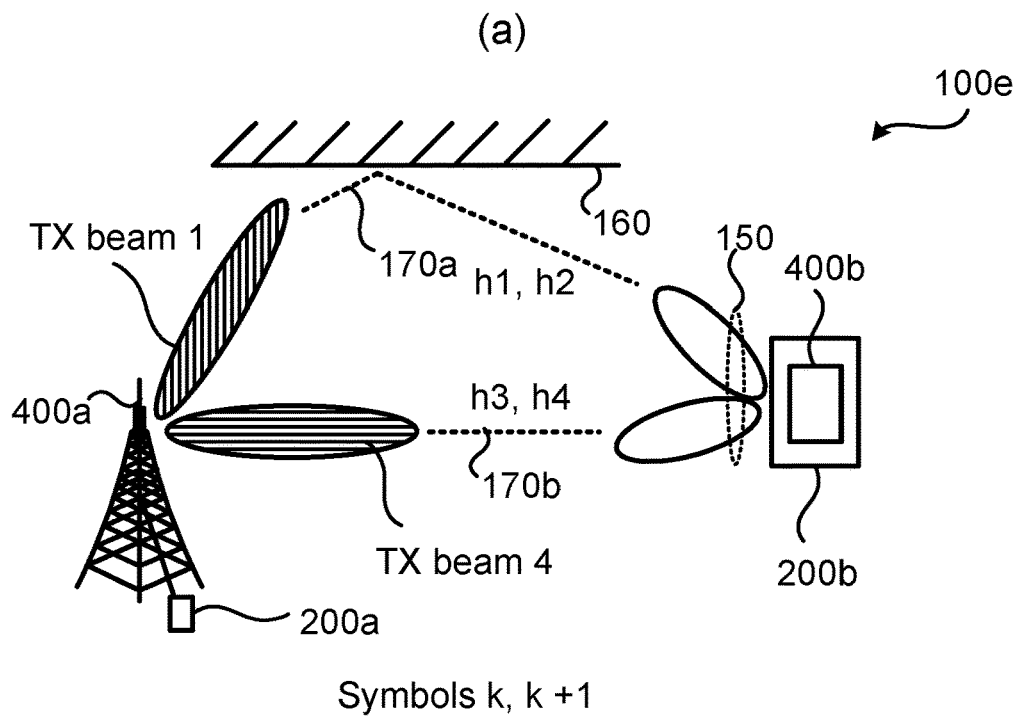
Figure 7:
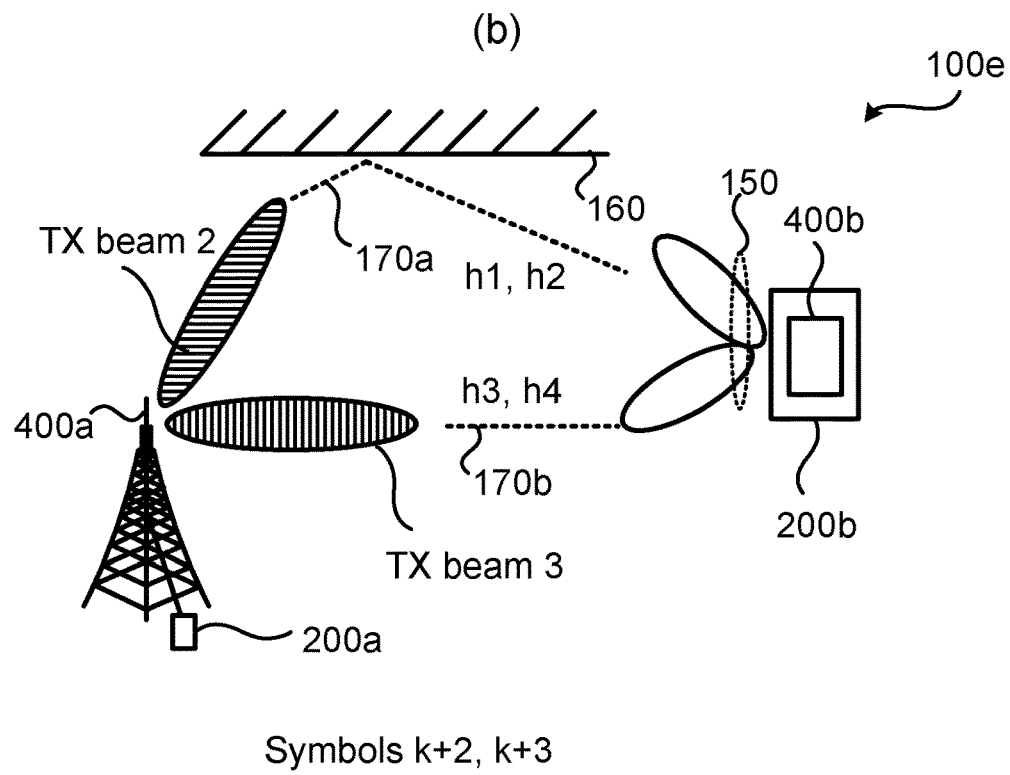

FIG. 7 gives an illustrative example of another scenario where at least some of the above disclosed embodiments are applied. In the illustrative communications network 100e of FIG. 7 which shows only a part of the communications network 100a of FIG. 1, radio transceiver device 200a, for each symbol, uses transmission beams 140 that have different spatial direction and different polarization. That is, as in FIG. 7 at (a), for the symbols k and k+1 (transmitted at time instances k and k+1) Tx beam 1 pointing in the first direction and having the first polarization is used together with Tx beam 4 pointing in the second direction and having the second polarization. Then, as in FIG. 7 at (b), for the symbols k+2 and k+3 (transmitted at time instances k+2 and k+3) Tx beam 2 pointing in the first direction and having the second polarization is used together with Tx beam 3 pointing in the second direction and having the first polarization. The reception beam usage at radio transceiver device 200*b* is such that both transmit beam directions used at radio transceiver device 200*a* are matched and that the polarization is matched as good as possible as well for radio transceiver device 200*b*.

Figure 8:
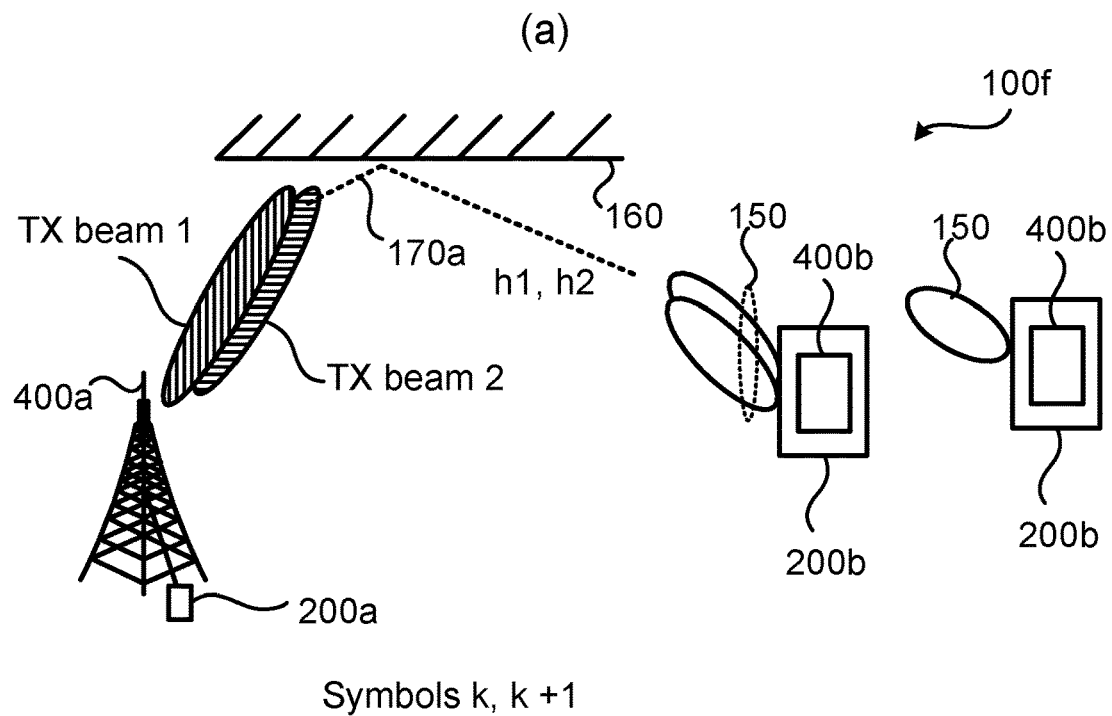
Figure 8:
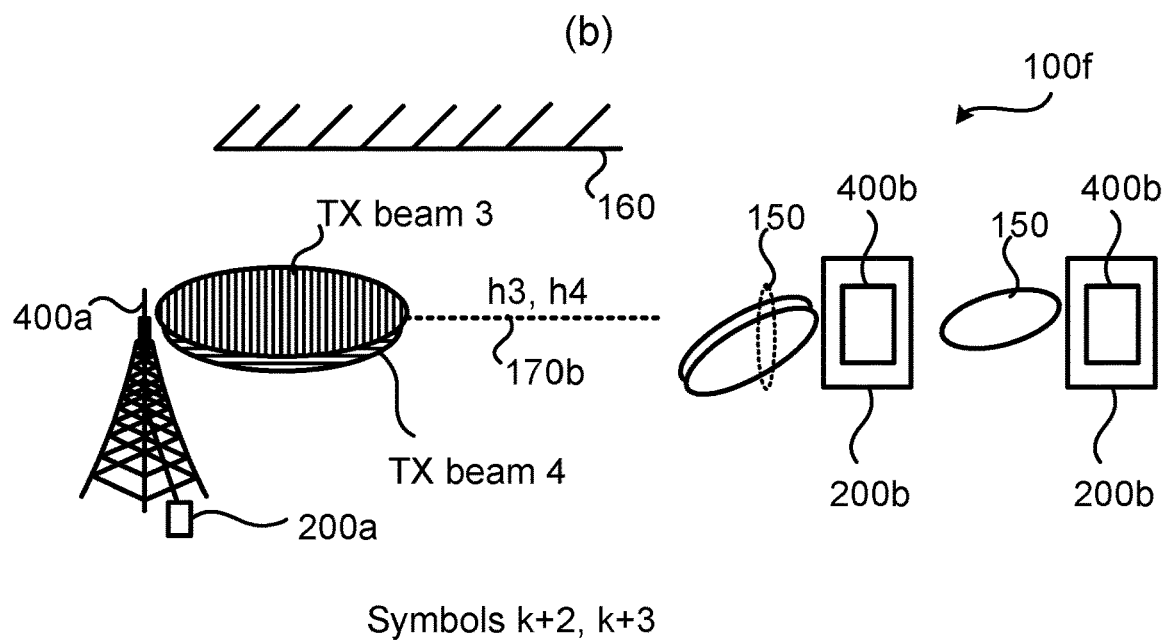

FIG. 8 gives an illustrative example of yet another scenario where at least some of the above disclosed embodiments are applied. In the illustrative communications network 100*f* of FIG. 8 which shows only a part of the communications network 100*a*, radio transceiver device 200*a* at each time instant uses virtual antenna ports that have similar spatial direction. That is, as in FIG. 8 at (a), for the symbols k and k+1 (transmitted at time instances k and k+1) Tx beam 1 pointing in the first direction and having the first polarization is used together with Tx beam 2 also pointing in the first direction but having the second polarization. Then, as in FIG. 8 at (b), for the symbols k+2 and k+3 (transmitted at time instances k+2 and k+3) Tx beam 3 pointing in the second direction and having the first polarization is used together with Tx beam 4 also pointing in the second direction but having the second polarization. By that it is likely that the radio transceiver device 200*b* as well can use reception beams 150 to match the transmission beams 140. In case the reception beams 150 have orthogonal polarization, any polarization mismatch between the transmission beams 140 and the reception beams 150 can be significantly reduced. In case of a single antenna port at radio transceiver device 200*b* (as in the rightmost radio transceiver device 200*b* of FIG. 8) a reception beam 150 with higher gain than the wide reception beam 150 in FIG. 5 can be used but still with lack of diversity.

Figure 9:
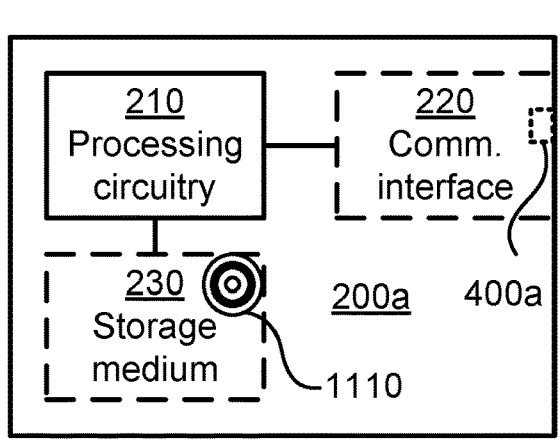
FIG. 9 is a schematic diagram showing functional units of a radio transceiver device according to an embodiment.

FIG. 9 schematically illustrates, in terms of a number of functional units, the components of a radio transceiver device 200*a* according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110 (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause radio transceiver device 200*a* to perform a set of operations, or steps, as disclosed above. For example, the storage medium 230 may store the set of operations, and the processing circuitry 210 may be configured to retrieve the set of operations from the storage medium 230 to cause radio transceiver device 200*a* to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. Radio transceiver device 200*a* may further comprise a communications interface 220 at least configured for communications with other devices, nodes, functions, and units in the communications networks 100*a*, 100*b*, 100*c*, 100*d*, 100*e*, 100*f*. As such the communications interface 220 may comprise one or more transmitters and receivers, comprising analogue and digital components.

Signals, such as reference signals as well as data and control signals, could be transmitted from, and received by, a TRP 400*a* of radio transceiver device 200*a*. The TRP 400*a* could form an integral part of radio transceiver device 200*a* or be physically separated from radio transceiver device 200*a*. The communications interface 220 might thus optionally comprise the TRP 400*a*.

The processing circuitry 210 controls the general operation of radio transceiver device 200*a* e.g. by sending data and control signals to the communications interface 220 and the storage medium 230, by receiving data and reports from the communications interface 220, and by retrieving data and instructions from the storage medium 230. Other components, as well as the related functionality, of radio transceiver device 200*a* are omitted in order not to obscure the concepts presented herein.

Figure 10:
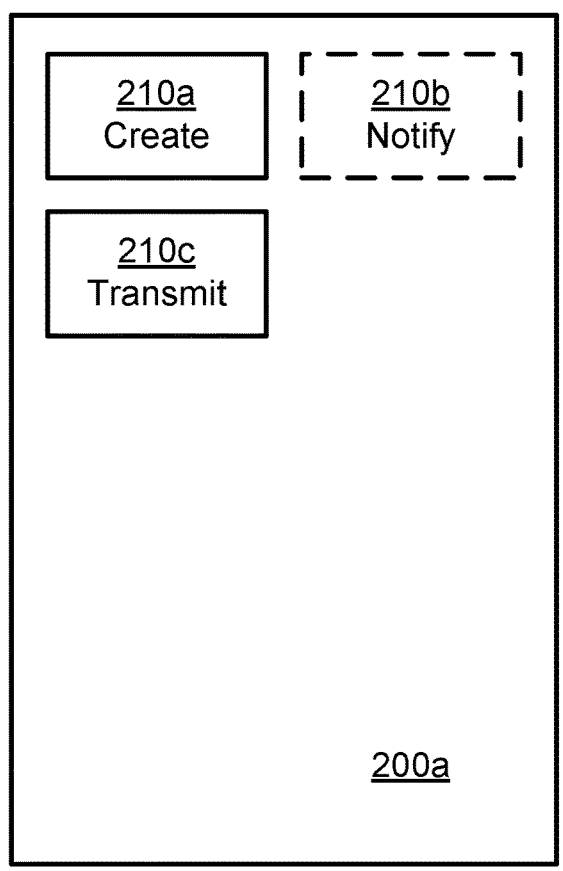
FIG. 10 is a schematic diagram showing functional modules of a radio transceiver device according to an embodiment.

FIG. 10 schematically illustrates, in terms of a number of functional modules, the components of a radio transceiver device 200*a* according to an embodiment. Radio transceiver device 200*a* of FIG. 10 comprises a number of functional modules; a create module 210*a* configured to perform step S102, and a transmit module 210*c* configured to perform step S106. Radio transceiver device 200*a* of FIG. 10 may further comprise a number of optional functional modules, such as a notify module 210*b* configured to perform step S104. In general terms, each functional module 210*a*-210*c* may in one embodiment be implemented only in hardware and in another embodiment with the help of software, i.e., the latter embodiment having computer program instructions stored on the storage medium 230 which when run on the processing circuitry makes radio transceiver device 200*a* perform the corresponding steps mentioned above in conjunction with FIG. 10. It should also be mentioned that even though the modules correspond to parts of a computer program, they do not need to be separate modules therein, but the way in which they are implemented in software is dependent on the programming language used. Preferably, one or more or all functional modules 210*a*-210*c* may be implemented by the processing circuitry 210, possibly in cooperation with the communications interface 220 and/or the storage medium 230. The processing circuitry 210 may thus be configured to from the storage medium 230 fetch instructions as provided by a functional module 210*a*-210*c* and to execute these instructions, thereby performing any steps as disclosed herein.

Radio transceiver device 200*a* may be provided as a standalone device or as a part of at least one further device. For example, radio transceiver device 200*a* may be provided in a node of the radio access network 110 or in a node of the core network 120. Alternatively, functionality of radio transceiver device 200*a* may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the radio access network 110 than instructions that are not required to be performed in real time.

Thus, a first portion of the instructions performed by radio transceiver device 200*a* may be executed in a first device, and a second portion of the of the instructions performed by radio transceiver device 200*a* may be executed in a second device; the herein disclosed embodiments are not limited to any particular number of devices on which the instructions performed by radio transceiver device 200a may be executed. Hence, the methods according to the herein disclosed embodiments are suitable to be performed by a radio transceiver device 200a residing in a cloud computational environment. Therefore, although a single processing circuitry 210 is illustrated in FIG. 9 the processing circuitry 210 may be distributed among a plurality of devices, or nodes. The same applies to the functional modules 210a-210c of FIG. 10 and the computer program 1120 of FIG. 11.

Figure 11:
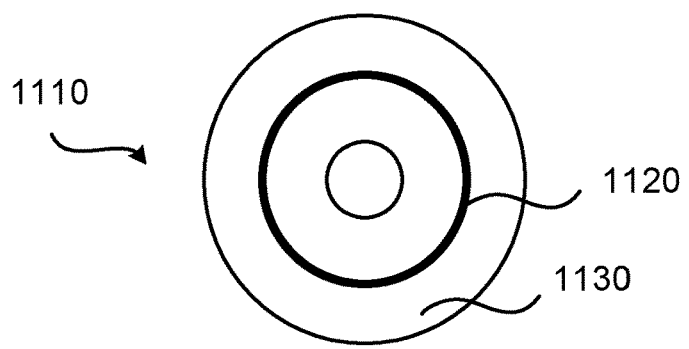
FIG. 11 shows one example of a computer program product comprising computer readable storage medium according to an embodiment.

FIG. 11 shows one example of a computer program product 1110 comprising computer readable storage medium 1130. On this computer readable storage medium 1130, a computer program 1120 can be stored, which computer program 1120 can cause the processing circuitry 210 and thereto operatively coupled entities and devices, such as the communications interface 220 and the storage medium 230, to execute methods according to embodiments described herein. The computer program 1120 and/or computer program product 1110 may thus provide means for performing any steps as herein disclosed.

In the example of FIG. 11, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for signal transmission diversity at an antenna array of a radio transceiver device, the antenna array having two physical antenna ports, the method being performed by the radio transceiver device, the method comprising:
creating two virtual antenna ports for each of the two physical antenna ports, resulting in four virtual antenna ports; and
transmitting the signal from the four virtual antenna ports towards another radio transceiver device over four different radio propagation channels, one radio propagation channel per virtual antenna port,
wherein a first and a second of the radio propagation channels propagate along a first path towards said another radio transceiver device, and wherein a third and a fourth of the radio propagation channels propagate along a second path towards said another radio transceiver device.

2. The method according to claim 1, wherein the virtual antenna ports are paired two and two, such that two pairs of virtual antenna ports are created.

3. The method according to claim 2, wherein each of the two pairs of virtual antenna ports has virtual antenna ports created from each of the two physical antenna ports.

4. The method according to claim 2, wherein, at each time instant, the signal only is transmitted from the two virtual antenna ports at one of the two pairs of virtual antenna ports.

5. The method according to claim 2, wherein the signal from a first of the two pairs of virtual antenna ports is transmitted over the first and the third of the radio propagation channels, and wherein the signal from a second of the two pairs of virtual antenna ports is transmitted over the second and the fourth of the radio propagation channels.

6. The method according to claim 2, wherein the signal from a first of the two pairs of virtual antenna ports is transmitted over the first and the fourth of the radio propagation channels, and wherein the signal from a second of the two pairs of virtual antenna ports is transmitted over the second and the third of the radio propagation channels.

7. The method according to claim 2, wherein the signal from a first of the two pairs of virtual antenna ports is transmitted over the first and the second of the radio propagation channels, and wherein the signal from a second of the two pairs of virtual antenna ports is transmitted over the third and the fourth of the radio propagation channels.

8. The method according to claim 1, wherein the signal from each of the four virtual antenna ports is transmitted in its own transmission beam.

9. The method according to claim 8, wherein two of the transmission beams in which the signal is transmitted from point along the first path and the remaining two of the transmission beams in which the signal is transmitted from point along the second path.

10. The method according to claim 8, wherein a respective first of the transmission beams in which the signal is transmitted from each of the two pairs of virtual antenna ports has a first polarization and a respective second of the transmission beams in which the signal is transmitted from each of the two pairs of virtual antenna ports has a second polarization.

11. The method according to claim 8, wherein a first of the transmission beams in which the signal is transmitted from each of the two pairs of virtual antenna ports point along the first path, and wherein a second of the transmission beams in which the signal is transmitted from each of the two pairs of virtual antenna ports point along the second path.

12. The method according to claim 8 wherein the antenna array has two sub-arrays, each sub-array defining its own panel, and wherein the virtual antenna port for the first radio propagation channel and the virtual antenna port for the third radio propagation channel are at a first of the two sub-arrays, and wherein the virtual antenna port for the second radio propagation channel and the virtual antenna port for the fourth radio propagation channel are at a second of the two sub-arrays.

13. The method according to claim 1, wherein the signal comprises a sequence of symbols S0, S1, S2, S3, . . . , and wherein transmission of the signal follows a pattern.

14. The method according to claim 13, wherein, according to the pattern, half the symbols are transmitted over two of the four radio propagation channels, and the remaining half of the symbols are transmitted over the two other radio propagation channels.

15. The method according to claim 14, wherein the pattern of transmitting the symbols S0, S1, S2, S3, . . . is defined such that:
the sequence of symbols S0, S1, 0, 0, . . . is transmitted over the first radio propagation channel,
the sequence of symbols 0, 0, S2, S3, . . . is transmitted over the second radio propagation channel, the sequence of symbols −S1*, S0*, 0, 0, . . . is transmitted over the third radio propagation channel, and the sequence of symbols 0, 0, −S3*, S2*, . . . is transmitted over the fourth radio propagation channel, where −Sx denotes negation of signal Sx, and Sx* denotes conjugation of signal Sx.

16. The method according to claim 14, wherein the pattern of transmitting the symbols S0, S1, S2, S3, . . . is defined such that:

the sequence of symbols S0, S1, 0, 0, . . . is transmitted over the first radio propagation channel, the sequence of symbols 0, 0, S2, S3, . . . is transmitted over the second radio propagation channel, the sequence of symbols 0, 0, −S3*, S2*, . . . is transmitted over the third radio propagation channel, and the sequence of symbols −S1*, S0*, 0, 0, . . . is transmitted over the fourth radio propagation channel, where −Sx denotes negation of signal Sx, and Sx* denotes conjugation of signal Sx.

17. The method according to claim 14, wherein the pattern of transmitting the symbols S0, S1, S2, S3, . . . is defined such that:

the sequence of symbols S0, S1, 0, 0, . . . is transmitted over the first radio propagation channel, the sequence of symbols −S1*, S0*, 0, 0, . . . is transmitted over the second radio propagation channel, the sequence of symbols 0, 0, S2, S3, . . . is transmitted over the third radio propagation channel, and the sequence of symbols 0, 0, −S3*, S2*, . . . is transmitted over the fourth radio propagation channel, where −Sx denotes negation of signal Sx, and Sx* denotes conjugation of signal Sx.

18. The method according to claim 13, further comprising:

notifying said another radio transceiver device of the pattern before transmitting the signal to said another radio transceiver device.

19. The method according to claim 1, wherein the antenna array is an analog antenna array.

20. A radio transceiver device for signal transmission diversity at an antenna array of the radio transceiver device, the antenna array having two physical antenna ports, the radio transceiver device comprising processing circuitry, the processing circuitry being configured to cause the radio transceiver device to:

create two virtual antenna ports for each of the two physical antenna ports, resulting in four virtual antenna ports; and transmit the signal from the four virtual antenna ports towards another radio transceiver device over four different radio propagation channels, one radio propagation channel per virtual antenna port, wherein a first and a second of the radio propagation channels propagate along a first path towards said another radio transceiver device, and wherein a third and a fourth of the radio propagation channels propagate along a second path towards said another radio transceiver device.

21. A computer program product for signal transmission diversity at an antenna array of a radio transceiver device, the antenna array having two physical antenna ports, the computer program product comprised on a non-transitory computer readable storage medium and comprising computer code which, when run on processing circuitry of a radio transceiver device, causes the radio transceiver device to:

create two virtual antenna ports for each of the two physical antenna ports, resulting in four virtual antenna ports; and transmit the signal from the four virtual antenna ports towards another radio transceiver device over four different radio propagation channels, one radio propagation channel per virtual antenna port, wherein a first and a second of the radio propagation channels propagate along a first path towards said another radio transceiver device, and wherein a third and a fourth of the radio propagation channels propagate along a second path towards said another radio transceiver device.

* * * * *